Oct. 30, 1934.  D. M. WINANS  1,978,975
POSITIVE FRICTION CLUTCH
Filed May 5, 1931  2 Sheets-Sheet 1
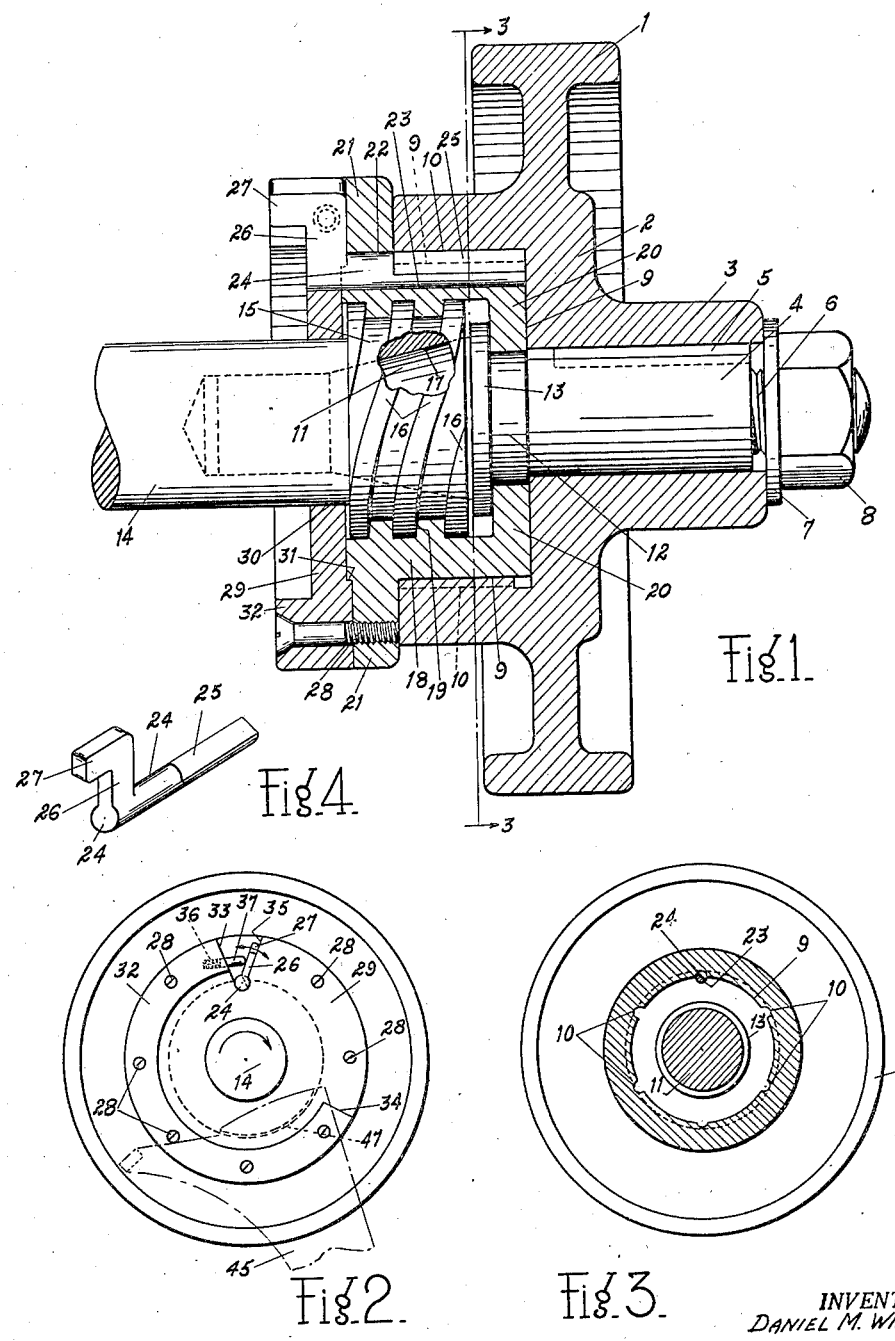

Oct. 30, 1934.  D. M. WINANS  1,978,975

POSITIVE FRICTION CLUTCH

Filed May 5, 1931  2 Sheets-Sheet 2

INVENTOR.
DANIEL M. WINANS
BY
ATTORNEY.

Patented Oct. 30, 1934

1,978,975

UNITED STATES PATENT OFFICE 1,978,975

POSITIVE FRICTION CLUTCH

Daniel M. Winans, Binghamton, N. Y., assignor to Daniel M. Winans Corporation, Binghamton, N. Y.

Application May 5, 1931, Serial No. 535,143

12 Claims. (Cl. 192—35)

My invention relates to a positive friction clutch and particularly to a simple mechanism for bringing into and out of engagement two frictional clutch surfaces whereby a driven part may be selectively positively coupled with or released from a driving member.

One of the principal objects of my invention is to provide a mechanism of this character which operates to produce the clutching and disengaging action without shock or jar and with a minimum number of moving parts.

Another important object of my invention is to provide means whereby the clutch engaging device is subject to instant operation.

A further object of my invention lies in the provision of a novel controlling means for operating the clutch engaging and disengaging mechanism.

Another feature of my invention resides in an arrangement of parts whereby upon engagement of the clutch surfaces, the heavier the load placed upon the driven member, the more positive is the clutch connection.

Other objects and advantages by way of detail will be apparent as the description proceeds, reference now being had to the figures of the accompanying drawings wherein like reference numerals indicate like parts.

In the drawings:

Figure 1 is a side sectional view of my clutch mechanism, certain parts being broken away for clearness.

Figure 2 is a front view of the clutch operating means and showing a portion of the controlling device therefor.

Figure 3 is a sectional view in reduced scale taken on the line 3—3 of Figure 1.

Figure 4 is a detail perspective view of the key comprising a part of my invention.

Figure 5:
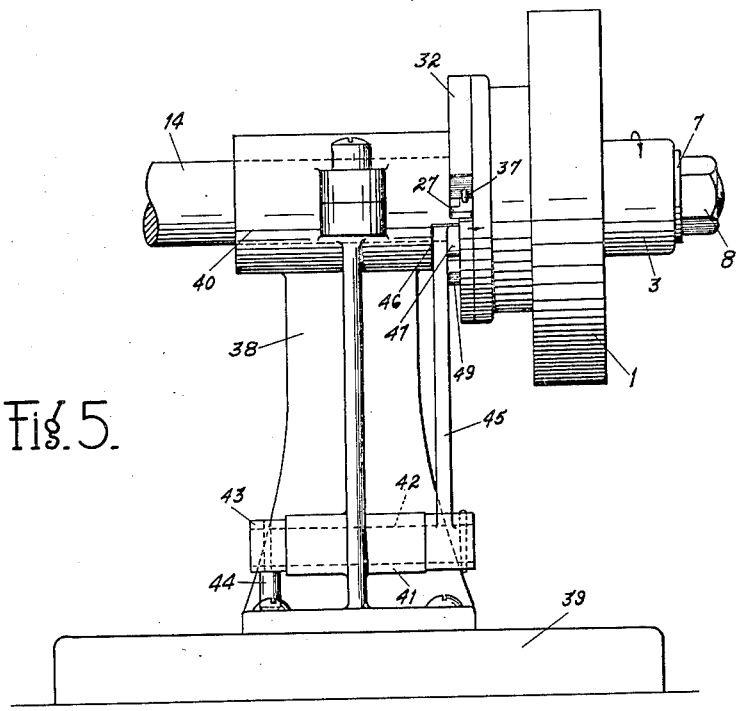
Figure 5 is a side view of a mechanism embodying my invention and showing in side elevation the clutch controlling means.

The reference character 1 indicates a driving member which may be a pulley, balance wheel, or a gear. This driving member may receive its power from any desired or suitable source as by belt or gear connection. As this forms no part of this invention no showing has been made thereof.

This driving member 1 is provided with a hub flange 2, one side of which is elongated centrally as at 3 to provide a hub for a shaft 4 which shaft is keyed rigidly to the driving member 1 as by means of the key whereby rotation of the driving member causes similar rotation of the shaft 4. This shaft may be threaded at its outer end as at 6 and provided with a lock washer 7 and nut 8 whereby the same is removably connected longitudinally to the hub 3 of the driving member.

The hub flange 2 of the driving member is extended on the opposite side from the hub 3, and centrally thereof, and recessed as at 9 to provide a circular hollow cup-like portion. The inner surface of this recessed portion is provided at spaced intervals with grooves or notches 10 of any desired number, six being shown for purposes of illustration. The purpose of these grooves will be apparent as the description proceeds.

The end of the shaft 4 opposite the nut 8 extends through the hub 2 and projects into and slightly beyond the recessed portion 9 of the hub. This end of the shaft is enlarged and conical in shape as shown at 11, tapering downwardly away from the recessed portion 9.

Intermediate the ends of the shaft 4, the same is shouldered and enlarged slightly as at 12 to provide a shoulder for a purpose to be described. Immediately adjacent this shoulder portion 12 and at the immediate rear enlarged end of the conical portion 11 of the shaft, the shaft is again shouldered and enlarged to provide the disk or ring-like portion 13. The purpose of this member will be apparent presently.

The reference character 14 indicates a shaft which comprises the driven member and which, of course, may be provided with any desired means for carrying the load to be driven and may be attached to or communicate with any mechanism which it is desired to drive by the driving member 1.

The inner end of this driven shaft 14 is provided with an enlarged portion 15 which is screw threaded as at 16 with coarse threads whereby the driven shaft 14 through the medium of this threaded portion and a cooperating threaded member may be screwed slightly longitudinally with respect to the conical end 11 of the driving shaft 4.

The enlarged end 15 of the driven shaft 14 is provided with a conical shaped recess 17 of a size and shape adapted to receive and frictionally engage with the conical end 11 of the shaft 4. Obviously, therefore, longitudinal movement of the shaft 14 to the right in Figure 1 engages the conical surfaces on the ends of the shafts 4 and 14 and the greater the longitudinal pull, the stronger will be the frictional binding engagement therebetween whereby the motion of the shaft 4 will be communicated to the shaft 14.

Threadably engaged upon the threads 16 of the enlarged end 15 of the shaft 14 is a nut 18 internally threaded as at 19 for engagement with the threads 16. This nut 18 is provided at its rear end with an inwardly turned circular flange 20 rotatably engaging with the shoulder portion 12 on the shaft 4. The inner surface of this flange 20 lies directly in back of the enlarged ring or flange 13 on the shaft 4 and is adapted releasably for binding engagement therewith as the nut is screwed along the threaded end of the shaft 14. The opposite end of the nut 18 is provided with an outwardly extending circular flange 21 adapted to lie directly in front of the end of the cup-like portion of the hub 2. There is, of course, a slight clearance provided to permit the longitudinal movement of the nut just described.

From the foregoing description it will be clear that because of the coarse character of the screw threads on the nut 18 and the end of the shaft 14, very slight rotation of the nut 18 in one direction will serve to tightly draw the conically recessed end of the shaft 14 into frictional binding engagement with the conical end of the driving shaft 4.

Means for causing the engagement and disengagement of these frictional clutch surfaces will now be described.

The flange 21 of the nut 18 is provided at one point with an opening 22 which opening is extended rearwardly along the periphery of the nut 18 in the form of a recess extending through to the rear end of the nut. This recess is open to the periphery of the nut and therefore, communicates with the inner notched surface of the cup-like portion 9 of the hub 2 of the driving member 1. This recess is indicated by the reference character 23. Disposed within the opening 22 and the recess 23 is the shank of a key member 24 adapted to be rocked therein. The circular shank of this key 24 is provided for a portion of its length equal to the depth of the cup portion 9 with a cut-a-way or flat portion 25. The shank of the key 24 is of such size that when the same is rotated or rocked in the recess 23, one of the flat edges thereof is adapted to extend into one of the notches 10 provided on the inner surface of the cup portion 9 whereby through the medium of this key the cup portion of the driving member 1 may be keyed to the nut 18 whereby the nut will rotate with the driving member 1.

The key 24 is provided at its outer end with a lateral extension 26 carrying an actuating head or member 27, said extension and head lying just forwardly of the flange 21 of the nut 18.

Rigidly secured to the front face of the flange 21 of the nut, as by the screws or other suitable means 28, is a retaining ring 29 provided with a central opening 30 to permit passage of the shaft 14 therethrough. The rear surface of this ring is shouldered slightly as at 31 to receive a similar shoulder on the outer face of the flange 21 whereby said ring is centered and snugly fitted against said flange. The central portion of this ring 29 lies directly immediately adjacent the opening 30 in front of the enlarged threaded portion 15 of the shaft 14 whereby to limit the longitudinal movement of the shaft 14 to the left in Figure 1.

This securing ring 29 is provided for a portion of its circumference with a forwardly extending flange 32, said flange being cut away from the point 33 to the point 34 as shown clearly in Figure 2.

At the point on the periphery of the ring 29 where the key 24 is located, the ring it notched its full thickness from the point 33 to the point 35 in Figure 2, the notch being V-shaped as shown and permitting limited rocking movement of the key 24 and its extension and head 26 and 27.

The ring 29 is provided with a recess 36 communicating with the V-shaped notch and within this recess is positioned a spring pressed pin 37 engaging with the extension 26 of the key and normally urging it to the right in Figure 2 in which position one of the flat edges of the key shank is so turned as to be engageable within one of the notches 10 in the cup portion 9 of the driving member 1. In such position of the key the extension 26 rests against one side of the V-shaped notch in the ring 29. It is obvious, of course, that if the key member be rocked in the opposite direction, the extension 26 and the head 27 thereof, will engage with the opposite side of the V-notch at the point 33 against the compression of the spring pressed pin. In this position of the key the shank thereof is so turned within the recess 23 that the flat portion 25 lies within the recess 23 of the nut and consequently does not engage within any of the notches 10 in the cup portion of the driving member. It is clear, therefore, that in such position the driving member 1 is free to rotate without rotating the nut 18.

From the foregoing it will be clear that with the key 24 rocked to its normal position as urged by the spring pressed pin 37, a flat edge thereof will engage in one of the notches 10 whereupon continued rotation of the driving member 1 serves to rotate the nut 18 in the direction of rotation of the driving member and such rotation of the nut instantly serves to screw the driven shaft 14 to the right in Figure 1 into tight frictional driving engagement with the shaft 4, such drawing and binding action being facilitated by virtue of the circular flange 20 engaging in back of the enlarged disk member 13 on the shaft 4. During such binding engagement, it is obvious, of course, that all of the parts above shown and described including the nut 18, key 24, and ring 29, will rotate together with the driving member 1 and the driven shaft 14. It is also obvious that the greater the load which may be placed upon the driven shaft 14, the greater will be the binding action between the clutch surfaces 11 and 17.

It will also be clear from this description that the clutching engagement is accomplished almost instantaneously for if the driving member 1 is rotating freely at a high speed, one of the notches 10 in the cup portion thereof will be in position for instant engagement by the flat edge of the key 24 as soon as it is rocked into engaging position therewith. Due to the coarseness of the threads on the shaft 14 and the nut 18, the same being designed and cut just inside of the angle of friction, the longitudinal movement of the shaft 14 into binding engagement is very slight and instantaneously accomplished. It may be stated here that while the threaded members 15 and 18 are cut barely inside the angle of friction, the clutch surfaces are just outside the angle of friction whereby instant and easy operation of the device is rendered possible.

It will be equally clear that if during the rotation of the entire mechanism shown in Figure 1, by virtue of this clutching engagement, the key 27 is rocked in the opposite direction against the side 33 of the V-notch in the ring 29 and the ring and consequently the nut 18 stopped from such rotation, the driving member 1 will be free to instantly continue its rotation with the shaft 4 and the driven shaft 14 will be simultaneously disengaged from its clutching connection with the shaft 4. The rocking of the key to such position, of course, turns the flat portion 25 thereof out of notch engaging position, thus releasing the nut from engagement with the driving member 1. Simultaneously as the nut 18 is stopped from rotating by a means to be described in connection with the key 24, the inertia of the rotating driven shaft 14 instantaneously serves to slightly unscrew said shaft to the left in Figure 1 out of its frictional engagement, whereupon the clutch connection is instantly disengaged.

By virtue of this novel construction the clutch elements may be engaged and disengaged very easily and quickly and completely without shock or strain upon any of the parts. Furthermore the clutching action is extremely positive in operation and presents no wearing surfaces and is entirely operable whether the parts are lubricated or not.

A novel means has been provided for controlling the clutch engaging and disengaging operations and such mechanism will now be described.

It should be stated here that there are, of course, many and varied mechanisms which could be employed for controlling the operation of the foregoing described clutch mechanism by co-acting with the key member 24 in the manner indicated. I have, however, devised a particular mechanism which is well adapted for this purpose and which is illustrated in Figures 2, 5, and 6 of the drawings.

With reference now to these figures, it will be noted that there is provided a standard or supporting arm 38 suitably secured upon a base 39 and carrying at its upper end a split bearing 40 supporting the driven shaft 14 and a journal for the other rotating parts of the device. This structure may take any desired form and comprises no part of this invention.

Provided upon the lower end of the standard 38 is a bearing member 41 adapted to receive a stub shaft 42 to one end of which is secured a finger piece 43 adapted to be rocked downwardly against the tension of a spring pressed pin 44 cooperating with the base of the standard. Rocking of this finger piece 43 serves to rock the shaft 42. The opposite end of the shaft 42 has secured thereon an upwardly extending arm 45 rockable with the shaft 42. The body portion of this arm 45 lies in a plane parallel to and just outside of the path of the ring 29 and its forwardly extending flange 32. The bearing 40 is cut away as at 46 (see Figure 5), to permit the upper end of this arm 45 to be positioned directly adjacent the face of the ring 29.

Figure 6:
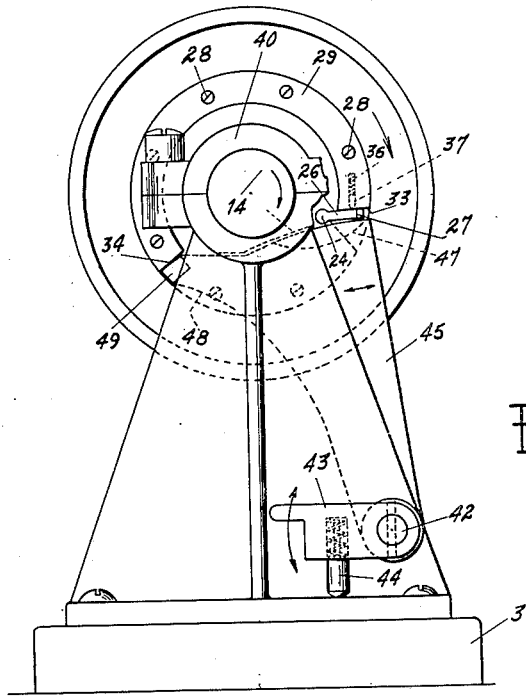
Figure 6 is a front view of the apparatus shown in Figure 5, certain parts being broken away for clearness.

This arm 45 carries at its upper end a laterally extending lug 47 curved on its underside as shown clearly in Figures 2 and 6, this curve being substantially concentric with the inner surface of the extending flange 32 on the ring 29. The upper edge of this lug 47, which is flush with the upper edge of the arm 45, lies normally in the path of the head 27 of the key 24 whereby when said key together with the ring sleeve and driving member 1 are rotated to the position shown in Figures 6, said lug 47 will engage said key and rock the same against the tension of the spring pressed plunger 37 into engagement with the side 33 of the V-shaped notch in which the key is rockable. Obviously in such position the ring 29 and nut 18 are positively prevented from further rotation and as the key 24 when in such position is turned out of engagement with the notches 10, the driving member 1 is free to rotate independently of the driven shaft 14 as before explained.

The upper end of the arm 45 has a lateral extension 48 provided at its end with an angularly disposed lug 49 which in the position just described is adapted to be engaged by the end 34 of the flange 32 on the ring 29. This prevents reverse rotation of the ring 29 under the influence of any natural rebound or under the influence of the spring pressed plunger 37.

Assuming the parts to be in the position shown in Figure 6, and it is desired to engage the clutching surface so as to drive the driven shaft 14 with the driving member 1, the operator merely rocks the finger piece 43 which in turn rocks the arm 45 to the left in Figure 6, thus bringing the lug 47 out of the path of the head 27 on the key and likewise bringing the lug 49 out of the path of the end of the flange 32, whereupon the key 24 is free to rock in the V-shaped notch in the ring 29 under the influence of the spring pressed pin 37 resulting in engagement of a flat edge of the key with one of the notches 10 in the driving member 1, whereupon the nut 18 is rotated to bring about the clutching engagement as heretofore described. Figure 2 shows the arm 45 rocked to such position and it will be noted that in such position the ring 29, nut 18, and driving member 1, are free to rotate without interference, the underside of the lug 47 being disposed within the flange 32 and the lug 49 outside of said flange.

Obviously as soon as the pressure on the finger piece 43 is released the arm 45 will, upon the cutout portion of the flange 32 passing the lug 47, resume its normal position as shown in Figure 6 in the path of the key head 27 and of course, form a rigid stop for the ring 29 when the key 24 is rocked to the side 33 of the V-notch.

It will be understood, of course, that the finger piece 43 is merely intended as illustrative only, as obviously there are many devices which could be provided with equal facility for rocking the arm 45. The form of this rocking device will, of course, depend upon the type of machine or apparatus upon which this clutch is used.

Of course, many changes may be made in details of construction and arrangement of parts without departing from the spirit and scope of my invention. I do not limit myself, therefore, to the exact form herein shown and described other than by the appended claims.

I claim:—

1. A positive friction clutch comprising a driving member and a driven member provided with clutch surfaces adapted for releasable frictional engagement, said driving member having a recessed portion, means on said driven member extending into said recessed portion for causing engagement of said surfaces, and rockable means carried by said first named means and adapted for selective cooperation with said driving member for actuating said engaging means.

2. A positive friction clutch comprising a driving member and a driven member provided with clutch surfaces adapted for releasable frictional engagement, rotatable means on said driven member cooperating with a portion of said driving member to prevent longitudinal movement of said means relative to said driving member for causing engagement of said surfaces, and rockable means carried by said rotatable means and adapted for selective cooperative engagement with said driving member for actuating said rotatable means.

3. A positive friction clutch comprising a driving member and a driven member provided with clutch surfaces adapted for releasable frictional engagement, rotatable means on said driven member cooperating with a portion of said driving member to prevent longitudinal movement of said means relative to said driving member for causing engagement of said surfaces, and rockable means carried by said rotatable means and adapted for selective cooperative engagement with said driving member for actuating said rotatable means, said second named means being normally urged to engaging position with said driving member.

4. A positive friction clutch comprising a driving member and a driven member provided with clutch surfaces adapted for releasable frictional engagement, rotatable means on said driven member cooperating with a portion of said driving member to prevent longitudinal movement of said means relative to said driving member for causing engagement of said surfaces, rockable means carried by said rotatable means and adapted for selective cooperative engagement with said driving member for actuating said rotatable means, said second named means being normally urged to engaging position with said driving member, and means for holding said second named means out of said engaging position.

5. A positive friction clutch comprising a freely rotatable driving member, a driven member, each of said members being provided with cooperable clutch surfaces adapted for releasable frictional engagement, a screw threaded member on said driven member, operable upon rotation in the direction of rotation of said driving member to draw said clutch surfaces into driving engagement, and means for selectively connecting and disconnecting said threaded member to and from said driving member, comprising a partially rotatable key journaled within said screw threaded member and cooperating with said driving member.

6. A positive friction clutch comprising a freely rotatable driving member, a driven member, each of said members being provided with cooperable clutch surfaces adapted for releasable frictional engagement, a screw threaded member on said driven member operable upon rotation in the direction of rotation of said driving member to draw said clutch surfaces into driving engagement, and a rockable key journaled within said screw threaded member for selectively connecting and disconnecting said threaded member to and from said driving member.

7. A positive friction clutch comprising a freely rotatable driving member, a driven member, each of said members being provided with cooperable clutch surfaces adapted for releasable frictional engagement, a screw threaded member on said driven member operable upon rotation in the direction of rotation of said driving member to draw said clutch surfaces into driving engagement, a rockable key journaled within said screw threaded member for selectively connecting and disconnecting said threaded member to and from said driving member, and means for disconnecting said key from engagement with said driving member and stopping the rotation of said threaded member.

8. A positive friction clutch comprising a freely rotatable driving member, a driven member, each of said members being provided with cooperable clutch surfaces adapted for releasable frictional engagement, a screw threaded member on said driven member operable upon rotation in the direction of rotation of said driving member to draw said clutch surfaces into driving engagement, a rockable key for selectively connecting and disconnecting said threaded member to and from said driving member, and means for disconnecting said key from engagement with said driving member and stopping the rotation of said threaded member, said means comprising a manually controlled pivoted arm movable into and out of engagement with said key.

9. A positive friction clutch comprising a freely rotatable driving member, a driven member, each of said members being provided with cooperable clutch surfaces adapted for releasable frictional engagement, a screw threaded member on said driven member operable upon rotation in the direction of rotation of said driving member to draw said clutch surfaces into driving engagement, a rockable key for selectively connecting and disconnecting said threaded member to and from said driving member, means for disconnecting said key from engagement with said driving member and stopping the rotation of said threaded member, said means comprising a manually controlled pivoted arm movable into and out of engagement with said key, and means normally urging said arm into key engaging position.

10. A positive friction clutch comprising a driving member and a driven member provided with clutch surfaces adapted for releasable frictional engagement, rotatable means for causing engagement and disengagement of said surfaces, and means comprising a rockable key journaled for substantially its entire length, for selective positive engagement with one of said members for actuating said rotatable means.

11. A positive friction clutch comprising a driving member and a driven member provided with clutch surfaces adapted for releasable frictional engagement, rotatable means for causing engagement and disengagement of said surfaces, and means comprising a rockable key journaled for substantially its entire length, for selective positive engagement with one of said members for actuating said rotatable means, said key being carried by said rotatable means.

12. A positive friction clutch comprising a driving member and a driven member provided with clutch surfaces adapted for releasable frictional engagement, rotatable means for causing engagement and disengagement of said surfaces, means comprising a rockable key journaled for substantially its entire length, for selective positive engagement with one of said members for actuating said rotatable means, said key being carried by said rotatable means and comprising an elongated shank portion of cylindrical contour and provided with a flat side, the member engaged thereby being provided with a plurality of notches for cooperation with said key.

DANIEL M. WINANS.